Sept. 24, 1963  S. B. HOSEGOOD ET AL  3,105,025
FLUID CIRCUITS
Filed May 27, 1958  2 Sheets-Sheet 1
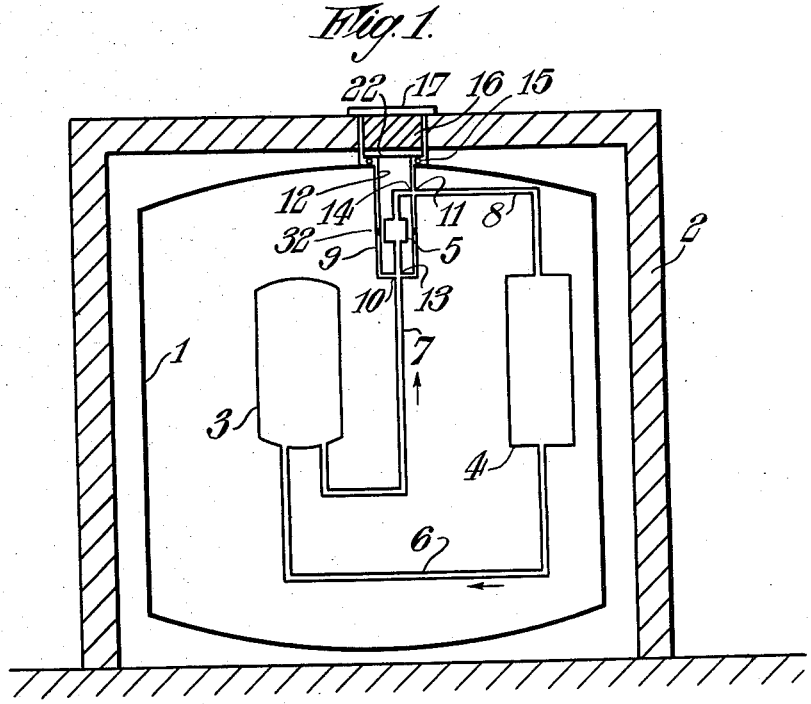
INVENTORS
SAMUEL BRITTAN HOSEGOOD
BRIAN EDWARD PUFFETT
JOSEPH HENRY SWAIN
BY
ATTORNEYS

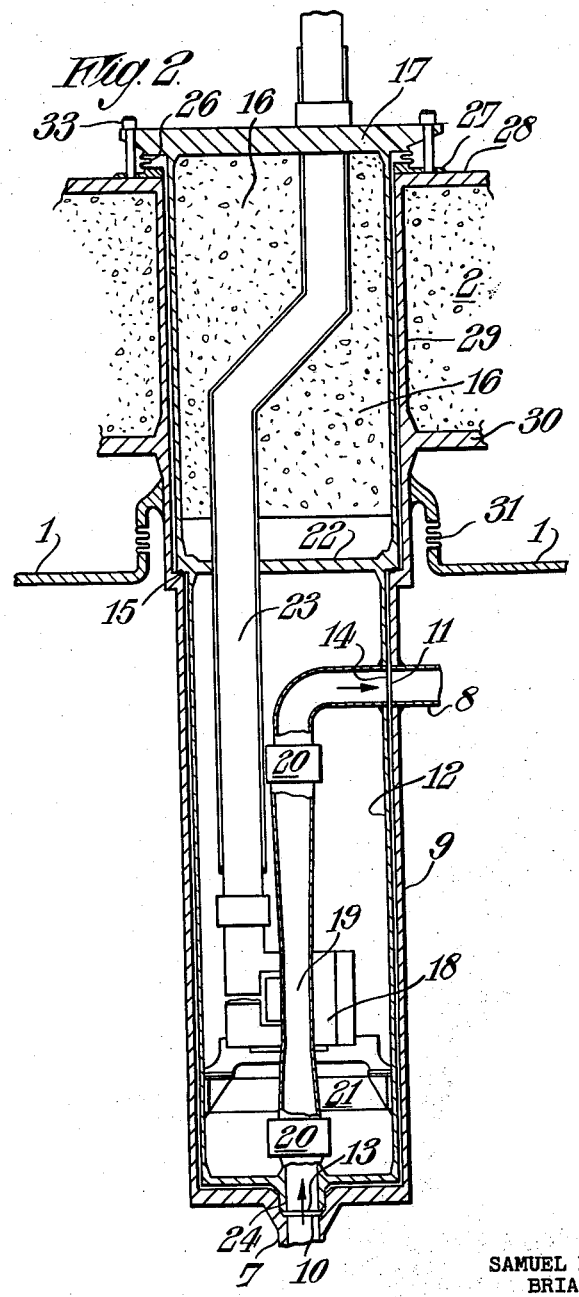

3,105,025
FLUID CIRCUITS
Samuel Brittan Hosegood, Didcot, and Brian Edward Puffett and Joseph Henry Swain, Wantage, England, assignors to United Kingdom Atomic Energy Authority, London, England
Filed May 27, 1958, Ser. No. 738,180
Claims priority, application Great Britain June 5, 1957
2 Claims. (Cl. 204—193.2)

This invention relates to fluid circuits and has one application in nuclear reactors using liquid coolants. It has a particular application in reactors in which the fuel consists of a solution or slurry of fissile material in a liquid metal coolant e.g., uranium or plutonium in bismuth.

In reactors of the kind set forth, the solution or slurry becomes extremely radioactive, and to reduce the risk of contamination resulting from leaks in the reactor core vessel or the associated pumps, heat-exchangers, piping etc., some designs enclose all these components within a sealed steel containing vessel. This vessel is enclosed in turn within a concrete biological shield.

Enclosing all the components within the steel vessel makes their maintenance extremely difficult, particularly as they become in time highly radioactive. Remote-control devices can be used, but such devices are slow and awkward to handle. A particular problem that arises is repairing or replacing components which form part of the liquid metal circuit and whose removal involves breaking the circuit. Examples of such components are electromagnetic pumps used to circulate the liquid metal through the reactor core and heat-exchangers. These pumps are more liable to require maintenance than the remainder of the circuit, because of the relatively fragile nature of the ducts, bellows etc., involved in their construction. Such components are usually interconnected in the liquid metal circuit by means of pipes and, for example, welded or flanged joints, and to remove a component it is necessary to disconnect the joints on each side of the component. The latter operation is extremely difficult when the joints are highly radioactive and located within the containing vessel.

It is one object of the present invention to provide means for interconnecting the components such that their removal from the liquid metal circuit does not require the breaking of any pipe joints. The use of the invention is not however restricted to liquid-metal cooled reactor circuits, or indeed to reactor coolant circuits in general, but can be applied for example to chemical engineering operations.

According to the present invention means for connecting a component into a fluid circuit located within a containing vessel comprises means defining a recess in the wall of said vessel, said recess having inlet and outlet pipe openings leading therefrom within the vessel, a container for said component adapted to fit in said recess and having inlet and outlet ports in the wall thereof for connection to the component located therewithin, means for making at least a partial seal between said container and said recess located between said inlet and outlet ports, and means for making a second seal between said container and said recess located between said ports and openings and the outer end of the container.

One of said ports may be located in an inner end face of said container, said port being provided with a short pipe extension adapted to enter a corresponding pipe opening in the recess and to form the partial seal therewith.

The second seal may be a compression seal and be backed by a third seal located at the outer end of the container.

The vessel may be enclosed in a thick-walled shield, the walls of said recess extending through the thick wall, said second seal being made inside the shield and said third seal being made outside the shield, the portion of the container inside the shield for containing the component being sealed off by an internal plate and the space between the plate and the outer end of the container containing shielding material.

The fluid circuit may be the coolant circuit of a nuclear reactor.

To enable the nature of the invention to be more readily understood, attention is directed towards the accompanying drawings wherein:

FIG. 1 is a schematic elevation of a liquid metal reactor circuit illustrating, by way of example, the principle of the invention.

FIG. 2 is an elevation illustrating an embodiment of the invention applied to the electromagnetic pump in the circuit of FIG. 1.

Referring firstly to FIG. 1, a steel reactor containing vessel 1 is enclosed within a concrete biological shield 2. Within the vessel 1 are located a reactor core vessel 3, a heat exchanger 4, and an electromagnetic pump 5, these three components being interconnected by means of pipes 6, 7 and 8. The direction of flow of the circulating liquid metal, which may be a uranium-bismuth slurry or solution, is shown by the arrows.

Formed in the upper wall of the vessel 1 is a cylindrical recess 9 having pipe openings 10 and 11 connected to pipes 7 and 8 respectively. Within the recess 9 is a container 12 containing the electromagnetic pump 5, the inlet and outlet ducts of which are connected to ports 13 and 14 respectively in the wall of the container. A compression seal 15 is provided between container and recess above the level of the port 14. The lower part of the container 12 is sealed off by a plate 22 and the upper part is partially filled with shielding material 16. The container is fastened to the outside of the shield 2 by means of a flanged plate 17 at the outer end of the container. It will be seen that, as ports 13 and 14 are located opposite pipe openings 10 and 11 respectively, the liquid metal circuit is completed through the pump. The pump also tends to pump metal between the outlet and inlet ports in the annular space between recess and container, but provided the container is made a sufficiently close fit in the recess, or a simple partial seal 32 is provided in the annulus between the inlet and outlet ports, the amount of metal so pumped can be made small compared with that circulated through the core and heat exchanger. In the event of failure of the pump, the system is first drained of liquid metal and the container and pump can then be withdrawn from the recess without disconnecting any pipe joints in the liquid metal circuit.

Turning now to FIG. 2, the recess 9 and container 12 are shown in more detail. The pump 5 is shown as consisting of a magnet and electrode assembly 18, a duct 19, and bellows units 20. The complete pump assembly is mounted on a mounting ring 21 welded to the wall of the container. Electrical leads 23 from the pump pass up through plate 22 and shielding material 16, taking a devious path through the latter to maintain the shielding.

To reduce the flow of liquid metal in the annular space between the recess and the container, and to help locate the latter in the former, the inlet port 13 is situated at the end of a short pipe section 24 extending from the end face of the container a short distance into the pipe 7, in which it is a sliding fit forming a partial seal.

tI should be noted that in other embodiments the container may not be a close fit in the recess and hence the outlet port and pipe opening need not be located opposite one another as shown. Also the direction of flow may be reversed.

Because a reactor of this type is normally designed to operate with a blanket of inert gas above the coolant, the second seal 15 is a gas-tight seal, the liquid metal level being normally maintained between this seal and the outlet port 14 by the pressure of gas trapped in the annulus below the seal.

The upper part of the container passes through a cylindrical steel tube 29 which is welded to upper and lower steel plates 28 and 30 respectively between which lies the concrete shield 2. The lower end of tube 29 is welded to the wall 1 of the containing vessel via a flexible bellows section 31 and forms the upper part of the recess 9.

For safety, the seal 15 is reinforced by a third seal formed by welds made between a bellows section 26, the flange 17 and a ring 27 welded to the plate 28. When it is desired to remove the container, either of these seal welds is broken, being rewelded when a container is replaced. The annular space between the two seals is continuously monitored for radioactivity by drawing off gas through a sampling pipe (not shown).

The flexible sections 31 and 26 are provided to allow for differential thermal expansions. For the same reason the nuts 33 which fasten the flange 17 are provided with spring washers (not shown).

When the system is drained prior to removing the container, it is necessary to empty from the annular space the liquid metal remaining there owing to the close fit between pipes 24 and 7. This is achieved by drilling a small hole (not shown) through the wall of the pipe 24, by means of which the liquid metal in the annular space drains into the pipe 7. This hole is of such a size that the amount of liquid metal circulated through it by the pump is negligible.

It will be appreciated that the invention is not restricted to use with electromagnetic pumps but can be adapted to contain other reactor circuit components such as heat-exchangers, chemical processing units etc.

We claim:

1. A nuclear reactor plant comprising a containing vessel, a reactor having a core vessel, a reactor coolant circuit connecting in series with the core vessel, said core vessel being located within said containing vessel and said coolant circuit including at least one component, said containing vessel comprising means defining an inwardly projecting recess in the wall of said vessel, said recess having an open outer end and having inlet and outlet pipe openings in the wall of the recess connected to the coolant circuit, a container containing said component, said container being dimensioned to fit in said recess and having inlet and outlet ports in the wall thereof connected to the component contained therein, said inlet and outlet ports being located to register with said inlet and outlet pipe openings respectively when the container is inserted in the recess, means for making at least a partial seal between said container and said recess to seal said inlet pipe opening and port from said outlet pipe opening and port, and means for making a second seal between said container and said recess located between said ports and openings and the outer end of the recess.

2. Means for connecting a component in series with a fluid circuit, said fluid circuit being located within a containing vessel, comprising a containing vessel for a fluid circuit, means defining an inwardly projecting recess in the wall of said vessel, said recess having an open outer end and having inlet and outlet pipe openings in the wall of the recess for connection to the fluid circuit, a container for a component, said container being dimensioned to fit in said recess and having inlet and outlet ports in the wall thereof for connection to the component, said inlet and outlet ports being located to register with said inlet and outlet pipe openings respectively when the container is inserted in the recess, at least one of said ports being located in an inner end face of said container, means comprising a short pipe extension on said one port adapted to enter a corresponding pipe opening in the recess for forming at least a partial seal between said container and said recess to seal said inlet pipe opening and port from said outlet pipe opening and port, means for making a pressure seal between said container and said recess located between said ports and openings and the outer end of the recess, said pressure seal comprising means for making a third seal between said container and said recess located at the outer end of the container, said vessel being enclosed in a thick walled shield, the walls of said recess extending through the thick wall, said second seal being made inside the shield and said third seal being made outside the shield, the portion of the container inside the shield for containing the component being sealed off by an internal plate and the space between the plate and the outer end of the container containing shielding material.

References Cited in the file of this patent

UNITED STATES PATENTS

| | | |
|---|---|---|
| 2,165,480 | Hastings | July 11, 1939 |
| 2,431,484 | Kaufman | Nov. 25, 1947 |
| 2,736,812 | Weinstein et al. | Feb. 28, 1956 |
| 2,766,962 | Fodor et al. | Oct. 16, 1956 |
| 2,868,708 | Vernon | Jan. 13, 1959 |
| 2,929,406 | Anderson | Mar. 22, 1960 |

OTHER REFERENCES

Proceedings of the International Conference on the Peaceful Uses of Atomic Energy, Aug. 8–20, 1955, vol. 3, page 339.